(12) United States Patent
Hartwig et al.

(10) Patent No.: US 11,130,197 B2
(45) Date of Patent: Sep. 28, 2021

(54) LASER BRAZED COMPONENT AND METHOD THEREFOR

(71) Applicant: Greatbatch Ltd., Clarence, NY (US)

(72) Inventors: Jordan A. Hartwig, East Aurora, NY (US); Kenneth B. Talamine, Plymouth, MN (US)

(73) Assignee: Greatbatch Ltd., Clarence, NY (US)

( * ) Notice: Subject to any disclaimer, the term of this patent is extended or adjusted under 35 U.S.C. 154(b) by 251 days.

(21) Appl. No.: 16/177,486

(22) Filed: Nov. 1, 2018

(65) Prior Publication Data

US 2019/0134745 A1 May 9, 2019

Related U.S. Application Data

(60) Provisional application No. 62/581,077, filed on Nov. 3, 2017.

(51) Int. Cl.
*B23K 26/32* (2014.01)
*H01M 50/528* (2021.01)
(Continued)

(52) U.S. Cl.
CPC .......... *B23K 26/323* (2015.10); *B23K 1/0056* (2013.01); *B23K 1/19* (2013.01);
(Continued)

(58) Field of Classification Search
CPC ...... B23K 1/19; B23K 1/0056; B23K 26/323; B23K 26/20; B23K 26/22; B23K 26/24;
(Continued)

(56) References Cited

U.S. PATENT DOCUMENTS

| 4,136,298 A | 1/1979 | Hansler |
| 6,193,765 B1 | 2/2001 | Nakanishi et al. |

(Continued)

FOREIGN PATENT DOCUMENTS

| JP | 0837051 | 2/1996 |
| JP | 2002224869 A | 8/2002 |
| WO | 2018038967 | 1/2018 |

OTHER PUBLICATIONS

Extended European Search Report, Application No. 18203972.7, dated Feb. 14, 2019.
(Continued)

*Primary Examiner* — Brian W Jennison
(74) *Attorney, Agent, or Firm* — Michael P. Horvath

(57) ABSTRACT

In various examples, a component is for use in an implantable medical device. The component includes a pin including a first material attached to a lead including a second material different from the first material of the pin. At least a portion of the lead includes a channel in which at least a portion of the pin sits, the channel including a channel opening defined at least partially by opposing first and second channel sides extending a channel length. At least a first joint is formed along at least a portion of the first channel side. The first joint includes the second material of the lead deformed to at least partially close the channel opening to retain the pin within the channel to attach the lead to the pin. In some examples, the first material includes molybdenum and the second material includes aluminum.

20 Claims, 6 Drawing Sheets

(51) Int. Cl.
  *B23K 26/323* (2014.01)
  *B23K 26/20* (2014.01)
  *B23K 1/19* (2006.01)
  *B23K 26/22* (2006.01)
  *B23K 26/24* (2014.01)
  *H01M 50/543* (2021.01)
  *B23K 1/005* (2006.01)
  *B23K 103/18* (2006.01)
  *H01M 50/172* (2021.01)
  *B23K 103/20* (2006.01)
  *B23K 101/36* (2006.01)

(52) U.S. Cl.
  CPC .............. *B23K 26/20* (2013.01); *B23K 26/22* (2013.01); *B23K 26/24* (2013.01); *H01M 50/528* (2021.01); *H01M 50/543* (2021.01); *B23K 2101/36* (2018.08); *B23K 2103/18* (2018.08); *B23K 2103/20* (2018.08); *H01M 50/172* (2021.01)

(58) Field of Classification Search
  CPC ............ B23K 2103/18; B23K 2103/20; B23K 2101/36; H01M 2/22; H01M 2/26; H01M 2/021; H01M 2/065; H01M 2/30
  See application file for complete search history.

(56) References Cited

U.S. PATENT DOCUMENTS

| | | | |
|---|---|---|---|
| 6,781,088 B2 | 8/2004 | Grubb et al. | |
| 6,852,925 B2* | 2/2005 | Wolf | H01M 2/08 |
| | | | 174/50.6 |
| 7,145,076 B2* | 12/2006 | Knappen | A61N 1/3754 |
| | | | 174/50.6 |
| 8,003,248 B2* | 8/2011 | Freitag | H01M 2/0426 |
| | | | 429/175 |
| 8,673,479 B2 | 3/2014 | Byun et al. | |
| 8,722,238 B2 | 5/2014 | Dai | |
| 9,553,296 B1* | 1/2017 | Dai | H01M 2/263 |
| 9,899,655 B2 | 2/2018 | Dai | |
| 10,069,129 B2 | 9/2018 | Kim et al. | |
| 2005/0228469 A1 | 10/2005 | Zarembo et al. | |
| 2005/0269299 A1 | 12/2005 | Rittner | |
| 2006/0175071 A1* | 8/2006 | Knappen | H01G 4/35 |
| | | | 174/50.56 |
| 2011/0123856 A1* | 5/2011 | Dai | H01M 6/005 |
| | | | 429/179 |
| 2011/0284284 A1* | 11/2011 | Talamine | A61N 1/3754 |
| | | | 174/650 |
| 2012/0248076 A1 | 10/2012 | Hosokawa et al. | |
| 2015/0041442 A1 | 2/2015 | Thieme et al. | |
| 2016/0064719 A1 | 3/2016 | Bushnell et al. | |
| 2016/0151853 A1 | 6/2016 | Lee et al. | |
| 2017/0033349 A1* | 2/2017 | Dai | H01M 4/5815 |
| 2018/0045232 A1 | 2/2018 | Capostagno et al. | |

OTHER PUBLICATIONS

First Substantive Examination Report, EP Application No. 18203972.7; dated Feb. 15, 2021.

* cited by examiner

LASER BRAZED COMPONENT AND METHOD THEREFOR

CROSS REFERENCE TO RELATED APPLICATIONS

This application claims the benefit of priority to U.S. Provisional Application Ser. No. 62/581,077, filed on Nov. 3, 2017, entitled "MOLYBDENUM TO ALUMINUM WELD TECHNIQUE," which is incorporated by reference herein in its entirety.

BACKGROUND

Laser welding is a common technique used to join metals. During laser welding of metals, energy from a laser beam penetrates through a first metal piece into a second metal piece, which accordingly heats portions of the two pieces to a sufficiently high temperature so that the two pieces melt and coalesce together to form a weld and join the two pieces together. However, obtaining consistent and robust weld joints can be challenging in some situations. For instance, small diameter welds that are required pursuant to configurations attendant to electrochemical cell components can be challenging to qualify due to the geometry of a round pin sitting on a flat lead. Moreover, some materials can be incompatible with laser welding. For instance, joining an aluminum piece to a molybdenum piece creates a weld filet including molybdenum and aluminum mixing, which results in a highly brittle weld joint.

OVERVIEW

This overview is intended to provide an overview of subject matter of the present patent document. It is not intended to provide an exclusive or exhaustive explanation of the invention. The detailed description is included to provide further information about the present patent document.

The present inventors have recognized, among other things, that the present subject matter can be used to join pieces together, for instance, to form a component for use in various applications, such as, but not limited to, electrochemical cell components. In various examples, the present subject matter is advantageous in that it provides a method of joining pieces formed from materials that are substantially incompatible with other methods of joining. For instance, the present subject matter is advantageous because it provides a method of joining an aluminum piece to a molybdenum piece to form a relatively strong joint between the pieces. Also, the present subject matter is advantageous in that it provides for a consistent and/or qualifiable method of joining two pieces together. The present subject matter can be used to join pieces together even in the event that the pieces are formed from materials that are difficult to attach to one another using one or more other methods of attachment. To better illustrate the devices described herein, a non-limiting list of examples is provided here:

Example 1 can include subject matter that can include a component for use in an electrochemical cell. The component includes a pin including a pin diameter and a pin length. The pin includes a first material. A lead is attached to the pin. The lead includes a lead width, a lead thickness, and a lead length. The lead includes a second material different from the first material of the pin. The lead and the pin are at least partially overlapped with one another. At least a portion of the lead that overlaps the pin includes a channel within the lead in which at least a portion of the pin sits. The channel includes a channel depth, a channel length, and a channel opening defined at least partially by opposing first and second channel sides extending the channel length. At least a first joint is formed along at least a portion of the first channel side. The first joint includes the second material of the lead deformed to at least partially close the channel opening at the location of the first joint, thereby retaining the pin within the channel of the lead to attach the lead to the pin.

In Example 2, the subject matter of Example 1 is optionally configured such that the second material of the lead is melted at the first joint to at least partially close the channel opening at the location of the first joint.

In Example 3, the subject matter of Example 2 is optionally configured such that the second material of the lead is melted at the first joint by brazing.

In Example 4, the subject matter of Example 3 is optionally configured such that the second material of the lead is melted at the first joint by laser brazing.

In Example 5, the subject matter of any one of Examples 1-4 optionally includes a second joint formed along at least a portion of the second channel side. The second joint includes the second material of the lead deformed to at least partially close the channel opening at the location of the second joint, thereby retaining the pin within the channel of the lead to attach the lead to the pin.

In Example 6, the subject matter of Example 5 is optionally configured such that the second material of the lead is melted at the second joint to at least partially close the channel opening at the location of the second joint.

In Example 7, the subject matter of Example 5 is optionally configured such that the second material of the lead is melted at the second joint by brazing.

In Example 8, the subject matter of Example 5 is optionally configured such that the second material of the lead is melted at the second joint by laser brazing.

In Example 9, the subject matter of Example 5 is optionally configured such that the first joint and the second joint are disposed along the channel at similar locations with respect to the pin.

In Example 10, the subject matter of any one of Examples 1-9 is optionally configured such that a melting point of the first material is higher than a melting point of the second material.

In Example 11, the subject matter of any one of Examples 1-10 is optionally configured such that the first material includes molybdenum and the second material includes aluminum.

In Example 12, the subject matter of any one of Examples 1-11 is optionally configured such that the channel depth is substantially equal to the pin diameter of the pin.

In Example 13, the subject matter of any one of Examples 1-12 is optionally configured such that a longitudinal axis of the pin is substantially aligned with a midline of the lead running the lead length.

Example 14 can include, or can optionally be combined with any one of Examples 1-13 to include subject matter that can include a method of attaching a pin to a lead to form a component. The pin includes a pin diameter and a pin length. The pin includes a first material. The lead includes a lead width, a lead thickness, and a lead length. The lead includes a second material different from the first material of the pin. The method includes aligning the pin with the lead so that at least a portion of the pin overlaps at least a portion of the lead. The portion of the pin overlapping the portion of the lead is pressed into the lead to form a channel within the lead. The channel includes a channel depth, a channel length, and a channel opening defined at least partially by opposing first and second channel sides extending the channel length. At least a first joint is formed along at least a portion of the first channel side. The first joint includes the second material of the lead deformed to at least partially close the channel opening at the location of the first joint, thereby retaining the pin within the channel of the lead to attach the lead to the pin.

In Example 15, the subject matter of Example 14 is optionally configured such that forming at least the first joint includes melting the second material of the lead at the first joint to at least partially close the channel opening at the location of the first joint.

In Example 16, the subject matter of Example 15 is optionally configured such that melting the second material of the lead includes brazing.

In Example 17, the subject matter of any one of Examples 14-16 optionally includes forming a second joint along at least a portion of the second channel side. The second joint includes the second material of the lead deformed to at least partially close the channel opening at the location of the second joint, thereby retaining the pin within the channel of the lead to attach the lead to the pin.

In Example 18, the subject matter of Example 17 is optionally configured such that forming the second joint includes melting the second material of the lead at the second joint to at least partially close the channel opening at the location of the second joint.

In Example 19, the subject matter of Example 18 is optionally configured such that melting the second material of the lead includes brazing.

In Example 20, the subject matter of any one of Examples 17-19 is optionally configured such that forming the first joint and forming the second joint each include laser brazing.

DETAILED DESCRIPTION

Figure 1:
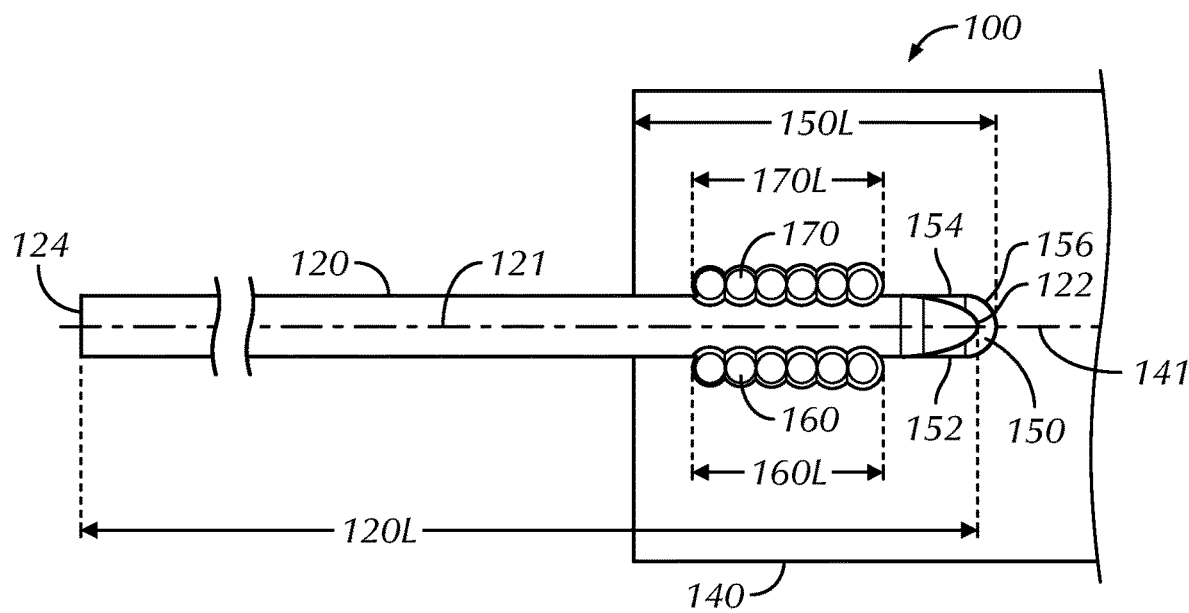
FIG. 1 is a top view of a component in accordance with at least one example of the invention.

The present invention relates generally to a joined component and a method of joining metallic elements, compounds, and compositions. More specifically, the present invention relates to a laser brazed component and a method of laser brazing such a component. In some examples, a molybdenum piece is joined to an aluminum piece to form the laser brazed component. In some examples, such a component can be used in electrochemical cell components. In some examples, such a component can be used in a medical device. In further examples, such a component can be used in an implantable medical device. However, the present subject matter is not intended to be so limited. As such, it is contemplated herein that the present subject matter can be used in various other components and/or in various other situations.

In some examples, the present subject matter provides a qualifiable joint between a pin and an aluminum lead for battery technologies. In further examples, the present subject matter can be used to join together a molybdenum pin and an aluminum lead. In still further examples, the present subject matter can be used to join a small-diameter molybdenum pin and a thin aluminum lead. For example, the present subject matter can be used to join together a 0.016-inch-diameter molybdenum pin and a 0.005-inch-thick aluminum lead for battery technologies. In other examples, the present subject matter includes a component formed using the joining method described herein. In some examples, qualifiable and laser brazing techniques are described, which allow for joining of small diameter battery configurations. In some examples, qualifiable and laser brazing techniques are described, which allow for joining challenging geometries, such as, for instance, a round pin sitting on a flat lead. With such a configuration, there is relatively little contact between the round pin and the flat lead (essentially, the contact includes a line along the pin at which the lead extends tangentially with respect to the pin). Moreover, such contact can be inconsistent, for instance, if the pin and/or the lead are bent or otherwise deformed from straight. In some examples, the present subject matter relates to joining of molybdenum and aluminum, where a relatively stable, non-brittle joint is formed.

Moreover, the present subject matter describes forming a joint between a molybdenum pin and an aluminum lead, for instance, that can be brazed using a laser, where the aluminum lead forms around the molybdenum pin so the aluminum lead can be melted over the radius of the molybdenum pin. Such joint designs provide for the aluminum piece to be melted over the molybdenum piece with minimum melting/mixing of molybdenum into the joint pool. The present methods accordingly minimize the formation of brittle joints borne out of intermetallic methods. Advantages of the present methods include, but are not limited to, the formation of aluminum lead around a molybdenum pin to create a relatively strong joint, which functions to relieve stress on the joint and allows for a proper joint pool composition to help avoid formation of a brittle joint.

Alternatives to the present methods include resistance welding of the molybdenum pin to the aluminum lead. However, resistance welding can create a joint that is difficult to qualify.

Although the description herein largely describes joining of a molybdenum piece to an aluminum piece, this is not intended to be so limited. This is merely one of many exemplary material combinations that can be joined using the presently-described method. As such, it is within the spirit and scope of the present invention that materials other than aluminum and molybdenum can be joined to form a component and/or using the method described herein.

Figure 2:
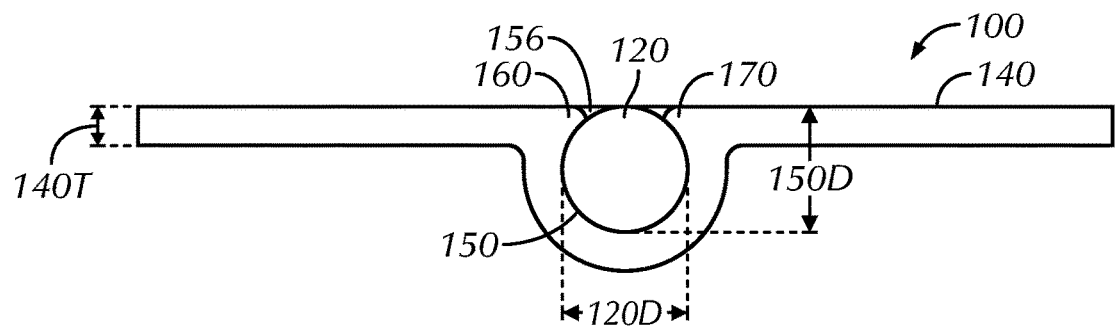
FIG. 2 is a side cross-sectional view of a component in accordance with at least one example of the invention.
Figure 3:
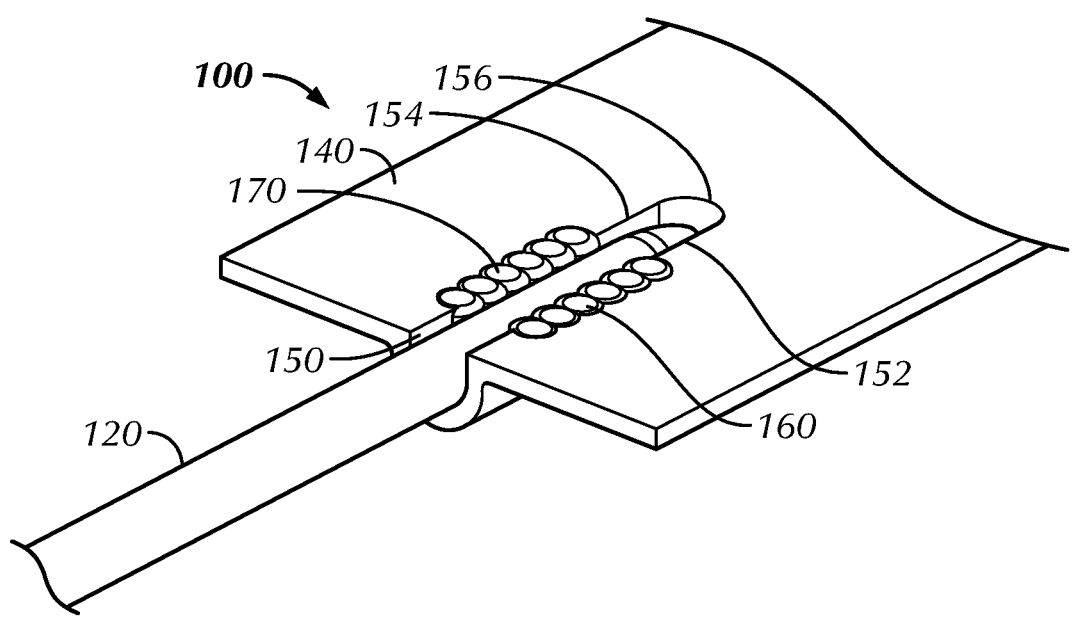
FIG. 3 is a perspective view of a component in accordance with at least one example of the invention.

Referring to FIGS. 1-3, in some examples, a component 100 is shown. In some examples, the component 100 is for use in an electrochemical cell, such as, for instance, a battery. In some examples, the component 100 can be used within a medical device. In further examples, the component 100 can be used within an implantable medical device. For instance, in various examples, the component 100 can be used within a pacemaker, a defibrillator, a cardiac monitor, a ventricular assist device, a drug delivery device, a neurostimulator, a deep brain stimulator, a cochlear implant, or a retinal implant, to name a few. However, this list of examples is not intended to be limiting. As such, in various examples, the component 100 can be used in other medical devices, implantable or external, not listed above. Moreover, in other examples, the component 100 can be used in non-medical devices.

In some examples, the component 100 includes a pin 120 including a pin diameter 120D and a pin length 120L. In some examples, the pin 120 includes a first end 122 and a second end 124. The pin 120, in some examples, includes a first material. In some examples, the first material of the pin 120 is molybdenum. In some examples, the pin 120 is formed entirely from the first material. In other examples, the pin 120 can be formed from the first material in addition to two or more other materials. In some examples, the pin 120 is a substantially cylindrical member having a longitudinal axis 121 along the pin length 120L. In some examples, the pin diameter 120D is relatively small. For instance, in some examples, the pin diameter 120D is substantially 0.016 inches. In other examples, the pin diameter 120D can be less than or greater than substantially 0.016 inches depending upon the application for which the component 100 is to be used. In other examples, the pin can include other shapes, including, but not limited to, flattened, square- or rectangle-shaped in cross section, triangle-shaped in cross section, ellipse-shaped in cross section, or the like.

Figure 4:
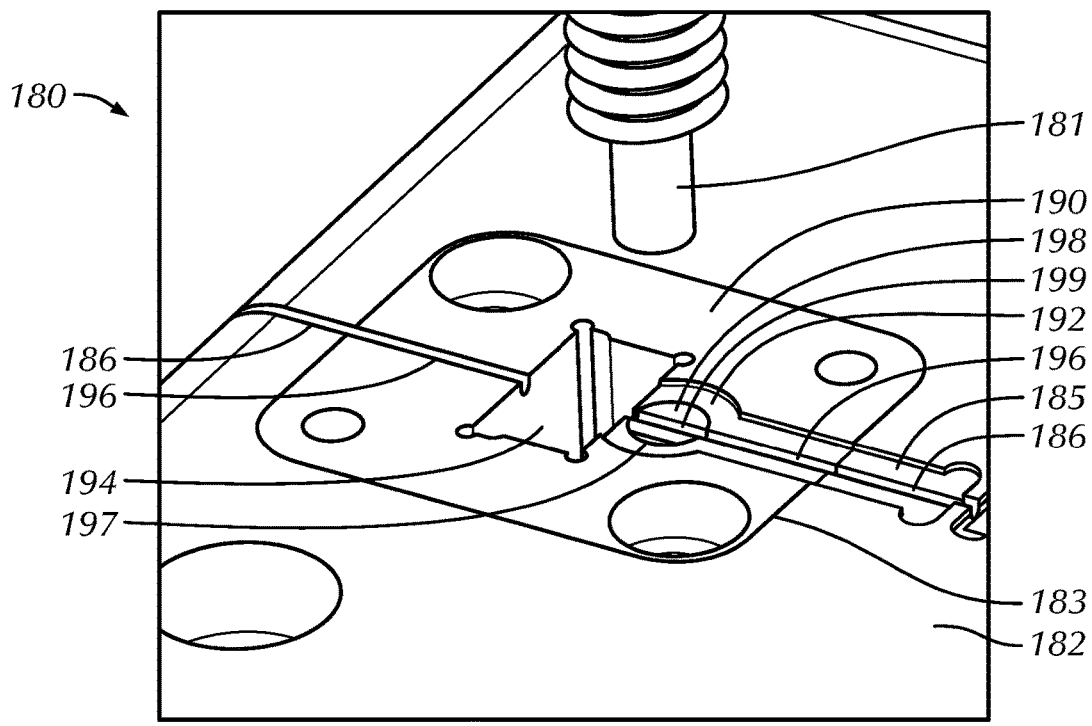
FIG. 4 is a perspective view of a system for joining a pin and a lead together to form a component in accordance with at least one example of the invention.

The component 100, in some examples, also includes a lead 140. In some examples, the lead 140 is attached to the pin 120 to form the component 100. In some examples, the lead 140 includes a lead width 140W (FIG. 4), a lead thickness 140T, and a lead length 140L (FIG. 4). The lead 140, in some examples, includes a second material different from the first material of the pin 120. In some examples, the second material of the lead 140 is aluminum. In some examples, the lead 140 is formed entirely from the second material. In other examples, the lead 140 can be formed from the second material in addition to two or more other materials. In some examples, the lead 140 is a substantially rectangular. In other examples, the lead can include shapes other than rectangular. In some examples, the lead thickness 140T is relatively small. For instance, in some examples, the lead thickness 140T is substantially 0.005 inches. In other examples, the lead thickness 140T can be less than or greater than substantially 0.005 inches depending upon the application for which the component 100 is to be used.

In some examples, the lead 140 and the pin 120 are at least partially overlapped with one another. The longitudinal axis 121 of the pin 120, in some examples, is substantially aligned with a midline 141 of the lead 140 running the lead length 140L. This is not intended to be limiting, however, such that, in other situations, having the pin 120 oriented differently with respect to the lead 140 may be advantageous in certain applications. For instance, in other examples, the pin 120 can be aligned perpendicularly with respect to the midline 141 of the lead 140. In still other examples, the pin 120 can be aligned with respect to the midline 141 of the lead 140 at an angle greater than zero degrees and less than ninety degrees.

In some examples, at least a portion of the lead 140 that overlaps the pin 120 includes a channel 150 within the lead 140 in which at least a portion of the pin 120 sits or rests. In some examples, the channel 150 includes a channel depth 150D, a channel length 150L, and a channel opening 156 defined at least partially by opposing first and second channel sides 152, 154 extending the channel length 150L. In some examples, the channel depth 150D is substantially equal to the pin diameter 120D of the pin 120. This is not intended to be limiting, however, such that, in other situations, having the pin diameter 120D greater than or less than the channel depth 150D may be advantageous in certain applications. For instance, in some examples, the pin diameter 120D can be less than the channel depth 140D such that the pin 120 can be retained completely within the channel 150 of the lead 140. In other examples, the pin diameter 120D can be greater than the channel depth 140D such that the pin 120 extends at least slightly outwardly from the channel 150 of the lead 140.

In some examples, the first end 122 of the pin 120 includes a rounded end 122, for instance, to inhibit the first end 122 from piercing the lead 140. With a rounded end 122, in some examples, the lead 140 is less likely to be pierced or otherwise damaged by the pin 120, for instance, if the lead 140 is bent with respect to the pin 120. That said, in other examples, the first end 122 of the pin can include shapes other than rounded, such as, but not limited to, a flat end, a pointed end, or a concave end, to name a few.

In some examples, at least a first joint 160 is formed along at least a portion of the first channel side 152. The first joint 160, in some examples, includes the second material of the lead 140 deformed to at least partially close the channel opening 156 at the location of the first joint 160, thereby retaining the pin 120 within the channel 150 of the lead 140 to attach the lead 140 to the pin 120. In some examples, the first joint 160 continuously extends a distance, for instance, a first joint length 160L, along the first channel side 152. In other examples, the first joint includes two or more discrete joints separated from one another along the first channel side 152.

In some examples, the second material of the lead 140 is deformed by melting the first material at the first joint 160 to at least partially close the channel opening 156 at the location of the first joint 160. In some examples, the second material of the lead 140 is melted at the first joint 160 by brazing. In further examples, the second material of the lead 140 is melted at the first joint 160 by laser brazing. In some examples, details about the laser brazing process can be similar to one or more of the examples of laser brazing processes that are described in U.S. Patent Application Publication No. 2017/0033349, U.S. application Ser. No. 15/289,392 to Dai et al., entitled "CONNECTOR FROM THE TAB OF AN ELECTRODE CURRENT COLLECTOR TO THE TERMINAL PIN OF A FEEDTHROUGH IN AN ELECTROCHEMICAL CELL," which is incorporated by reference herein in its entirety. In other examples, the second material of the lead 140 can be melted at the first joint 160 in other ways, such as, but not limited to, one or more of using a torch, a furnace, induction, resistance, infrared, or the like. In some examples, the first joint 160 can be formed in a vacuum to decrease contaminants in the first joint 160, improve thermal properties of the first joint 160, and/or improve mechanical properties of the first joint 160, for instance.

In some examples, a second joint 170 is formed along at least a portion of the second channel side 154. The second joint 170, in some examples, includes the second material of the lead 140 deformed to at least partially close the channel opening 156 at the location of the second joint 170, thereby retaining the pin 120 within the channel 150 of the lead 140 to attach the lead 140 to the pin 120. In some examples, the second joint 170 continuously extends a distance, for instance, a second joint length 170L, along the second channel side 152. In other examples, the second joint includes two or more discrete joints separated from one another along the second channel side 154. In some examples, the first joint 160 and the second joint 170 are disposed along the channel 150 at similar locations with respect to the pin 120. In other examples, the first and second joints 160, 170 can be staggered with respect to each other or otherwise disposed at different locations from one another along the channel 150.

In some examples, the second material of the lead 140 is deformed by melting the first material at the second joint 170 to at least partially close the channel opening 156 at the location of the second joint 170. In some examples, the second material of the lead 140 is melted at the second joint 170 by brazing. In further examples, the second material of the lead 140 is melted at the second joint 170 by laser brazing. In some examples, details about the laser brazing process can be similar to one or more of the examples of laser brazing processes that are described in U.S. Patent Application Publication No. 2017/0033349, U.S. application Ser. No. 15/289,392 to Dai et al., entitled "CONNECTOR FROM THE TAB OF AN ELECTRODE CURRENT COLLECTOR TO THE TERMINAL PIN OF A FEEDTHROUGH IN AN ELECTROCHEMICAL CELL," which is incorporated by reference herein in its entirety. In other examples, the second material of the lead 140 can be melted at the second joint 170 in other ways, such as, but not limited to, one or more of using a torch, a furnace, induction, resistance, infrared, or the like. In some examples, the second joint 170 can be formed in a vacuum to decrease contaminants in the second joint 170, improve thermal properties of the second joint 170, and/or improve mechanical properties of the second joint 170, for instance.

In some examples, by deforming the lead 140 around the pin 120 to form the channel 150 of the lead 140, two contact areas are formed where the first and second channel sides 152, 154 abut the pin 120. These contact areas, in some examples, provide for consistent and ample contact between the pin 120 and the lead 140 to aid in the formation of relatively strong, reproducible, qualifiable first and second joints 160, 170.

In some examples, after the first joint 160 and the second joint 170 are formed, a gap between the first and second joints 160, 170 is less than the diameter 120D of the pin 120. In other examples, after the first joint 160 is formed, a gap between the first joint 160 and the second channel side 154 is less than the diameter 120D of the pin 120. In still other examples, after the second joint 170 is formed, a gap between the second joint 170 and the first channel side 152 is less than the diameter 120D of the pin 120. In various examples, such configurations further help to retain the pin 120 connected to the lead 140.

In some examples, the second material is heated to a temperature at least slightly above a melting point of the second material, which allows the second material to flow or wet over the first material. When the second material cools, the first joint 160 and/or the second joint 170 is formed and the pin 120 and the lead 140 are joined together. In some examples, the second material of the lead 140 is substantially the only material that is melted. That is, little to none of the first material is melted in the process. In some examples, the melting point of the first material is higher than a melting point of the second material. In some examples, the first material is molybdenum, which has a melting point of substantially 2,623° C., and the second material is aluminum, which has a melting point of substantially 660° C. As such, by heating the pin 120 and the lead 140 to at least slightly above 660° C. (at standard pressure), but below 2,623° C. (at standard pressure), the aluminum of the lead 140 can flow over or wet the surface of the molybdenum of the pin 120 to join the pin 120 and the lead 140 upon cooling of the aluminum of the lead 140 to below the melting point of the aluminum of the lead 140. Of course, in other examples, materials other than molybdenum and aluminum can be used for the first and second materials, respectively, in a manner similar to that which is described above, but the temperature to which the second material is heated would vary according to the first and second materials used to form the pin 120 and the lead 140, respectively.

In this way, the present subject matter can be used to join two materials which are not generally considered compatible to join. For instance, in some examples, the present subject matter can be used to join materials that, when mixed, can form brittle intermetallics. This is because substantially only one of the two or more materials being joined melts, thereby inhibiting the likelihood that the two or more materials will mix. This is true in the example in which the first material is molybdenum and the second material is aluminum. Mixing of molybdenum and aluminum in an intermetallic pool often forms brittle intermetallics which can lead to the formation of a brittle joint between such materials. However, in the examples of the present subject matter, by melting substantially only the second material (aluminum, for instance), the issue of mixing of the first and second materials (for instance, molybdenum and aluminum, respectively, in some examples) is largely avoided, if not eliminated, thereby inhibiting the likelihood of forming brittle intermetallics and, in turn, a brittle joint.

In other examples, the second material of the lead 140 is deformed by crimping, pressing, or otherwise cold working the second material of the lead 140 to deform the second material of the lead 140 into the channel opening 156 to at least partially close the channel opening 156. In still further examples, the pin 120 and the lead 140 can be joined using friction welding, resistance welding, or the like.

Referring to FIGS. 4-7, in some examples, a laser brazing apparatus 180 can be used to join together the pin 120 and the lead 140 to form the component 100, as described herein. It is noted that, while the joining process is largely described herein using the laser brazing apparatus 180, this is merely for ease in description. As such, it should be understood that other forms of apparatuses for accomplishing other types of joining (such as, but not limited to, the other forms of joined described herein) can be used to join the pin 120 and the lead 140 to form the component 100 and are, therefore, contemplated herein. The laser brazing apparatus 180, in some examples, includes a base 182 configured to maintain the pin 120 and the lead 140 positioned for joining and a laser head 184 configured to impart energy (for instance, a laser beam 184A) to at least one of the pin 120 and the lead 140 in order to raise the temperature of at least one of the first and second materials in order to join the pin 120 and the lead 140, as described herein. At least some aspects of the laser brazing apparatus 180 specific to the joining of the pin 120 and the lead 140 are described herein, but, for the sake of simplicity, not all details of the laser brazing apparatus 180 are described. As such, further details about a similar laser brazing apparatus are described in U.S. Patent Application Publication No. 2017/0033349, U.S. application Ser. No. 15/289,392 to Dai et al., entitled "CONNECTOR FROM THE TAB OF AN ELECTRODE CURRENT COLLECTOR TO THE TERMINAL PIN OF A FEEDTHROUGH IN AN ELECTROCHEMICAL CELL," which is incorporated by reference herein in its entirety.

In some examples, the base 182 includes an opening 183 within which an insert block 190 can be placed. In some examples, the block 190 is formed from stainless steel. In some examples, the block 190 is machined to include features to aid in alignment and/or relative placement of the pin 120 and the lead 140 with respect to each other and/or with respect to the laser head 184 and/or the laser brazing apparatus 180. In some examples, such features include a first recess 192 configured to accept and align the lead 140 with respect to the laser brazing apparatus 180. A second recess 194, in some examples, allows for placement of other pieces during laser brazing. In the example shown in FIG. 5, the second recess 194 allows for placement of a header or lid 10 for a battery and an insulator 20, each of which is attached to the pin 120 prior to joining of the pin 120 to the lead 140. In some examples, the second recess 194 can be differently configured to accommodate pieces other than the header 10 and/or the insulator 20 depending on the component being made. In other examples, the second recess can be eliminated altogether, for instance, if no additional pieces are to be used to make the component.

In some examples, the block 190 includes a block groove 196 configured for placement of the pin 120 therein. In some examples, the base 182 can also or alternatively include a base groove 186 which is continuous with the block groove 196 of the block 190, for instance, to facilitate placement of the pin 120 within the laser brazing apparatus 180 and/or to allow placement of a larger pin within the laser brazing apparatus 180. The base 182, in some examples, can include a recess 185 continuous with the first recess 192 of the block 190, for instance, to facilitate placement of the lead 140 within the laser brazing apparatus 180 and/or to allow placement of a larger lead within the laser brazing apparatus 180.

In some examples, the block 190 includes an opening 197 within which an insert 198 is placed. The insert 198, in some examples, is disposed in a location with respect to the laser brazing apparatus 180 at which the laser brazing occurs. That is, the insert 198 is placed in the location most likely to be damaged by the laser head 184. In this way, in some examples, the insert 198 can be replaced with another insert 198 should the first insert 198 become damaged, thereby decreasing the likelihood of damage to the block 190, in turn reducing the likelihood (and expense) of replacing the block 190. In some examples, the insert 198 includes an insert groove 199 configured to be continuous with the block groove 196 of the block 190 to facilitate placement of the pin 120 within the laser brazing apparatus 180. In other examples, there need not be an opening and a removeable insert within the block. In such examples, the entire block could be replaced if the laser beam 184A damages the block.

The block 190, in some examples, is removable and/or replaceable with the same block 190 or another block 190. In some examples, the block 190 is removable so that the block 190 can be replaced with another similarly configured block 190, for instance, if the first block 190 is damaged through normal wear and tear and/or if the laser beam 184A damages the block 190. In other examples, the block 190 can be removed and another, differently configured block can be placed within the opening 183 of the base 182 to allow for a different component to be made (for instance, a component that is differently shaped, sized, or otherwise configured than the component 100 described herein). In other examples, the above-described features of the block 190 can be incorporated into the base, thereby eliminating the block altogether, such that the base itself is configured to align and position the pin 120 with respect to the lead 140 for joining of the pin 120 with the lead 140 to form the component 100.

In some examples, the laser brazing apparatus 180 includes one or more holders 188, 189 for securement of the pin 120 and/or the lead 140 during laser brazing. In some examples, a first holder 188 is selectively actuated to retain or release the first end 122 of the pin 120. In some examples, a second holder 189 is selectively actuated to retain or release the lead 140. In some examples, once the lead 140 and the pin 120 are properly placed within the laser brazing apparatus 180, the first and second holders 188, 189 can be actuated to retain the lead 140 and the pin 120 in position within the laser brazing apparatus 180 and/or in position with respect to one another. In some examples, once the pin 120 is joined to the lead 140 to form the component 100, the first and second holders 188, 189 can be released to remove the component 100 from the laser brazing apparatus 180. In the example shown in FIG. 5, the first and second holders 188, 189 are actuated to retain or release the pin 120 and the lead 140 by rotation of first and second fasteners 188A, 189A, respectively. For instance, in some examples, rotation of the first fastener 188A and/or the second fastener 189A in a first direction causes tightening of the first holder 188 and/or the second holder 189, respectively, to retain the pin 120 and/or the lead 140. In further examples, rotation of the first fastener 188A and/or the second fastener 189A in a second direction causes loosening of the first holder 188 and/or the second holder 189, respectively, to release the pin 120 and/or the lead 140. Although fasteners 188A, 189A are described for actuation of the first and second holders 188, 189, this is not intended to be limiting. As such, it is contemplated herein that the first and second holders 188, 189 can be actuated using actuators other than fasteners, such as, but not limited to pneumatic clamps, spring grips, or the like.

Referring now to FIGS. 4, 5, and 8-12, in some examples, a method of attaching the pin 120 to the lead 140 to form the component 100 is shown. In some examples, the pin 120 is aligned with the lead 140 so that at least a portion of the pin 120 overlaps at least a portion of the lead 140 (see FIG. 8). In some examples, this is achieved by placing the lead 140 within the first recess 192 and the pin 120 within a portion of the block groove 196. The longitudinal axis 121 of the pin 120, in some examples, is substantially aligned with a midline 141 of the lead 140 running the lead length 140L. This is not intended to be limiting, however, such that, in other situations, having the pin 120 oriented differently with respect to the lead 140 may be advantageous in certain applications. In some examples, the first recess 192 and the block groove 196 of the laser brazing apparatus 180 facilitate alignment of the pin 120 and the lead 140 with one another and with respect to the laser brazing apparatus 180.

Figure 9:
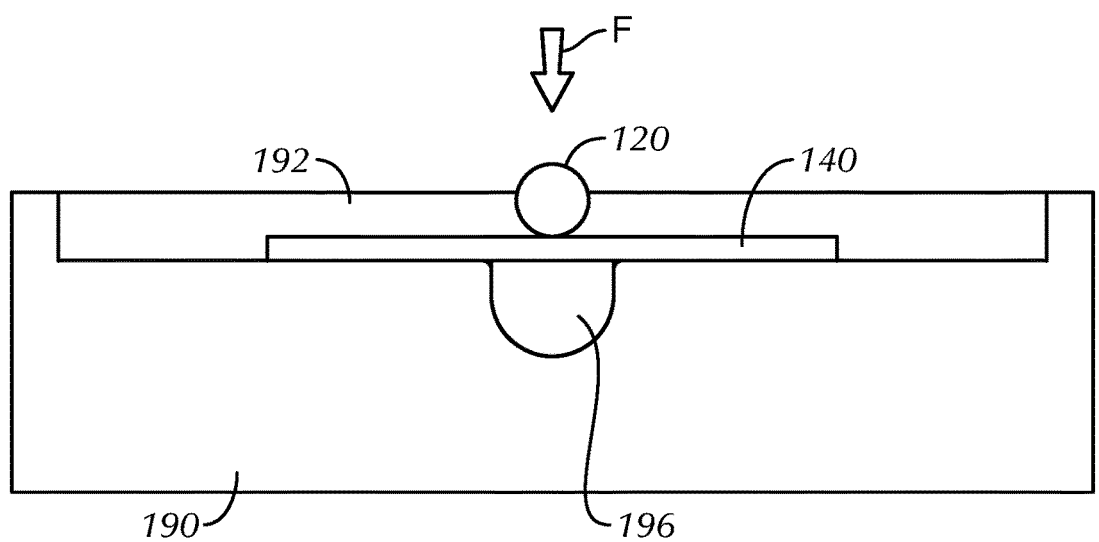
FIG. 9 is a side cross-sectional view of a pin and a lead prior to being pressed and joined together to form a component in accordance with at least one example of the invention.
Figure 10:
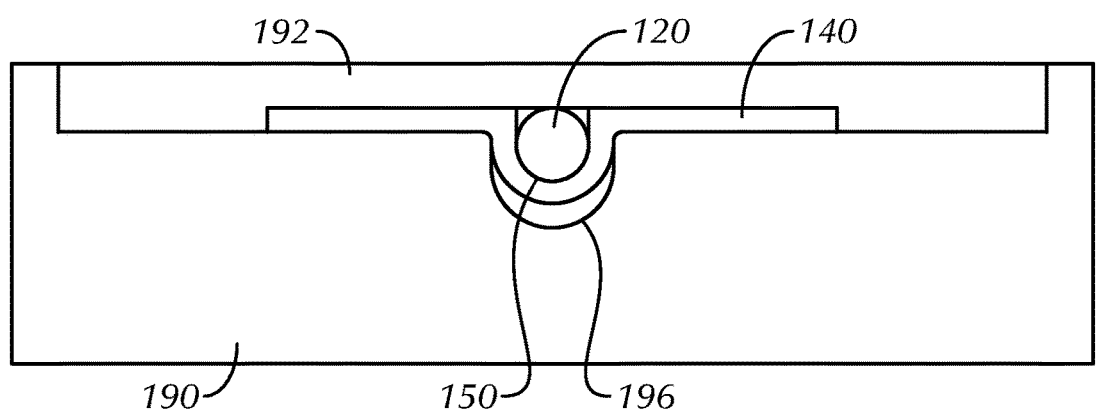
FIG. 10 is a side cross-sectional view of a pin and a lead pressed together but prior to being joined together to form a component in accordance with at least one example of the invention.
Figure 11:
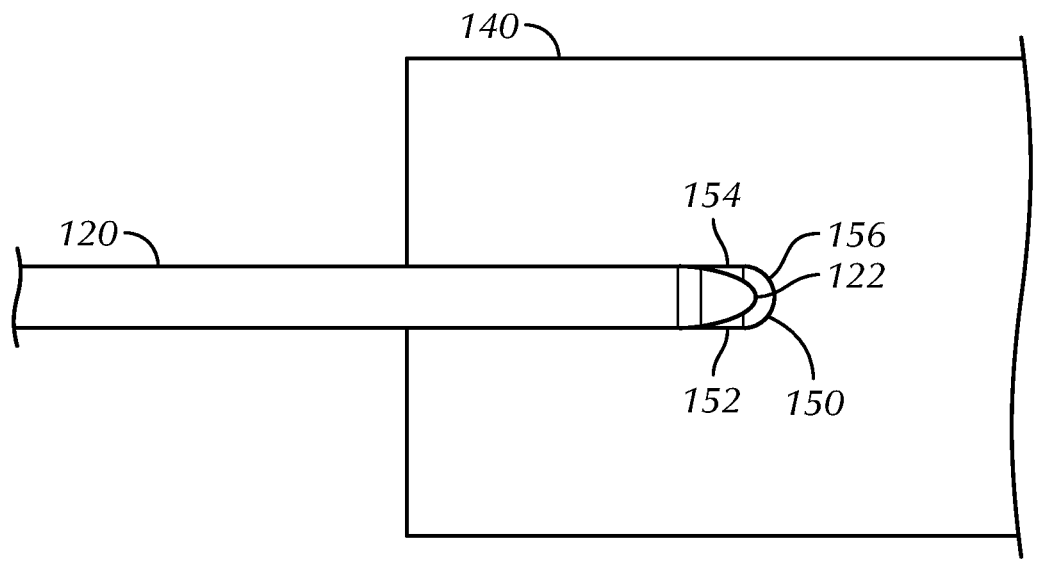
FIG. 11 is a top view of a pin and a lead pressed together but prior to being joined together to form a component in accordance with at least one example of the invention.

Once the pin 120 is properly positioned with respect to the lead 140, in some examples, the portion of the pin 120 overlapping the portion of the lead 140 is pressed into the lead 140 to form the channel 150 within the lead 140 (see FIGS. 9-11). In some examples, a force F is applied to the pin 120 to push the pin 120 against the lead 140 and deform the lead 140 into the block groove 196 of the laser brazing apparatus 180, thereby forming the channel 150 in the lead 140. In some examples, the force F is applied using a press. In some examples, the press is manually actuated using a lever once the pin 120 is in place with respect to the lead 140. In other examples, the press is automatically actuated once the pin 120 is in place with respect to the lead 140. For instance, in some examples, once the pin 120 is in place with respect to the lead 140, the press can be actuated to move a foot 181 (see FIG. 4) into contact with the pin 120 to apply the force F and push the pin 120 into the lead 140 and into the block groove 196 to form the channel 150 in the lead 140. In other examples, the force F can be applied to the pin 120 and the lead 140 in other ways. For instance, in some examples, the pin 120 can be manually pushed into the block groove 196 using a digit of an operator. Once the pin 120 is pressed into the lead 140 and the block groove 196, in some examples, the press and the foot 181 can be removed and the laser head 184 can be positioned over the base 182. In other examples, the base 182 with the pin 120 and lead 140 disposed therein can be removed from under the foot 181 of the press and placed under the laser head 184.

Figure 5:
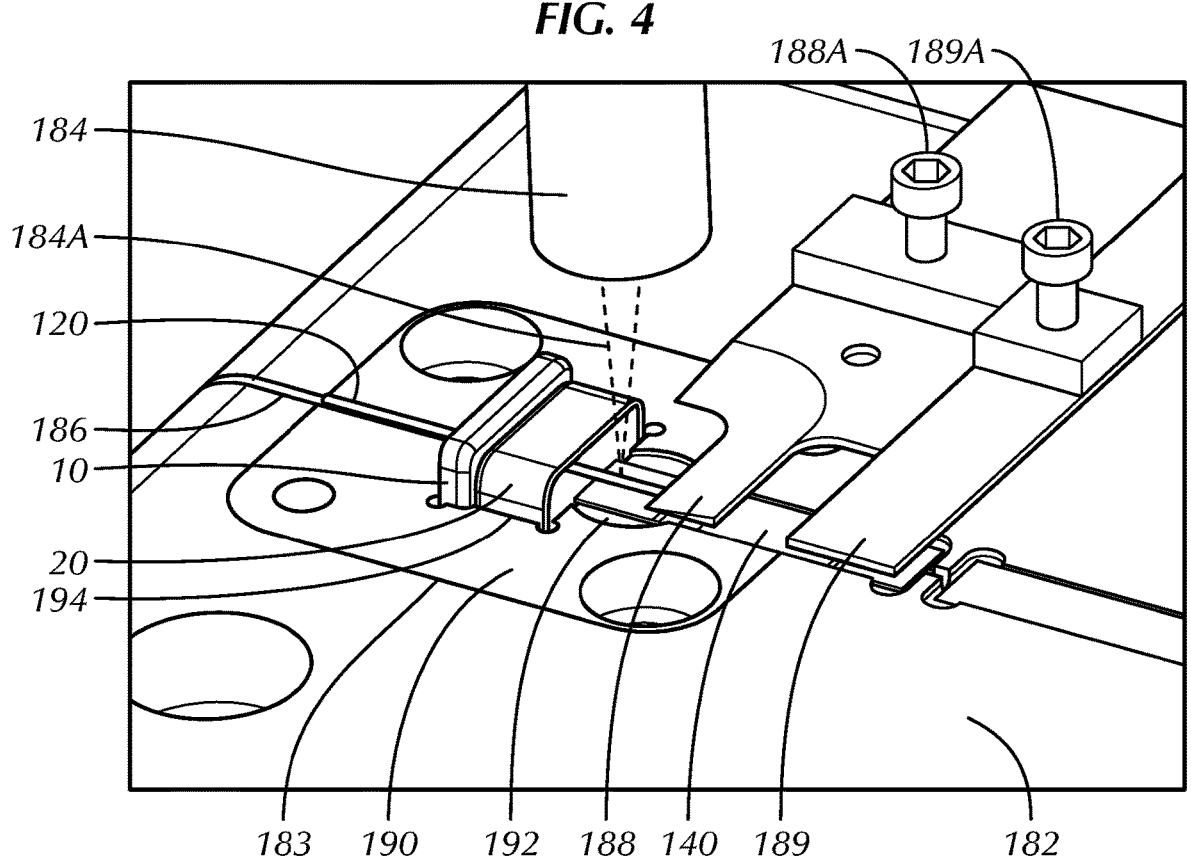
FIG. 5 is a perspective view of a system for joining a pin and a lead together to form a component in accordance with at least one example of the invention, the system including a pin and a lead in place within the system.
Figure 6:
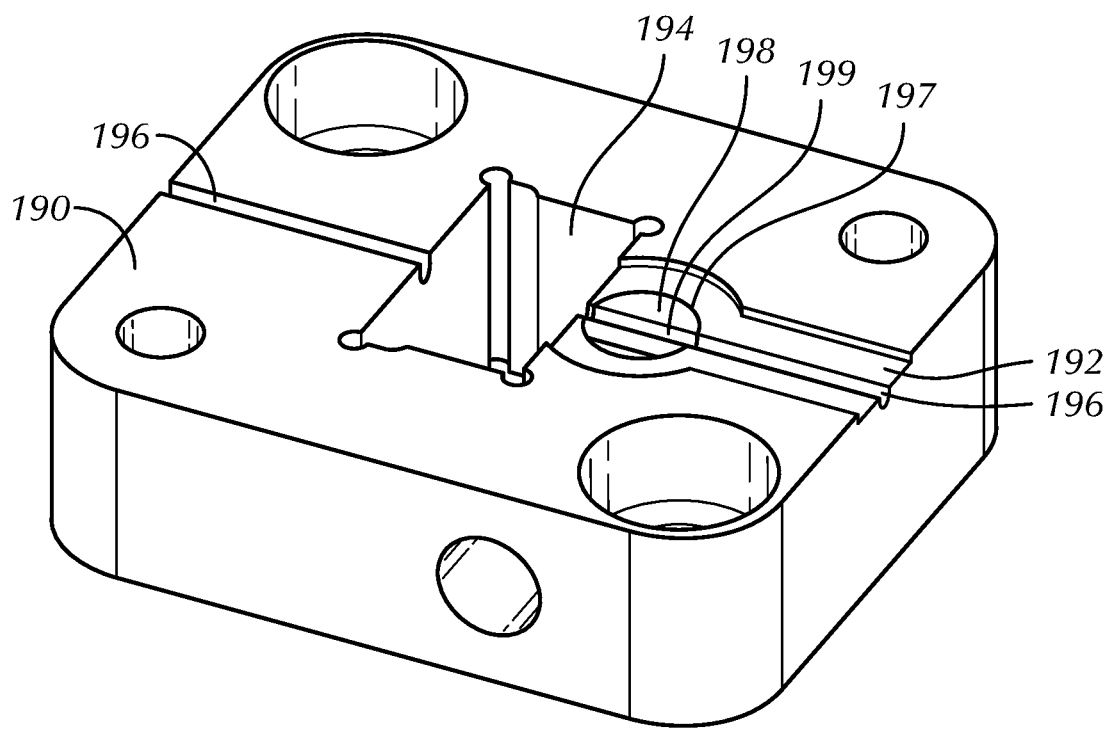
FIG. 6 is a perspective view of a base for a system for joining a pin and a lead together to form a component in accordance with at least one example of the invention.
Figure 7:
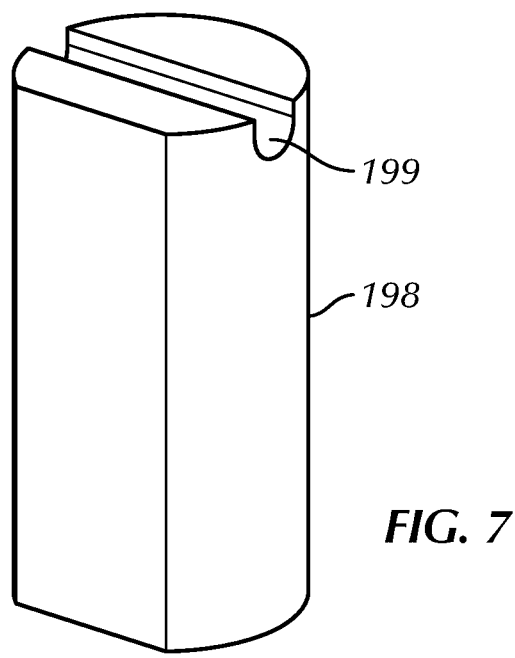
FIG. 7 is a perspective view of an insert for a base of a system for joining a pin and a lead together to form a component in accordance with at least one example of the invention.
Figure 8:
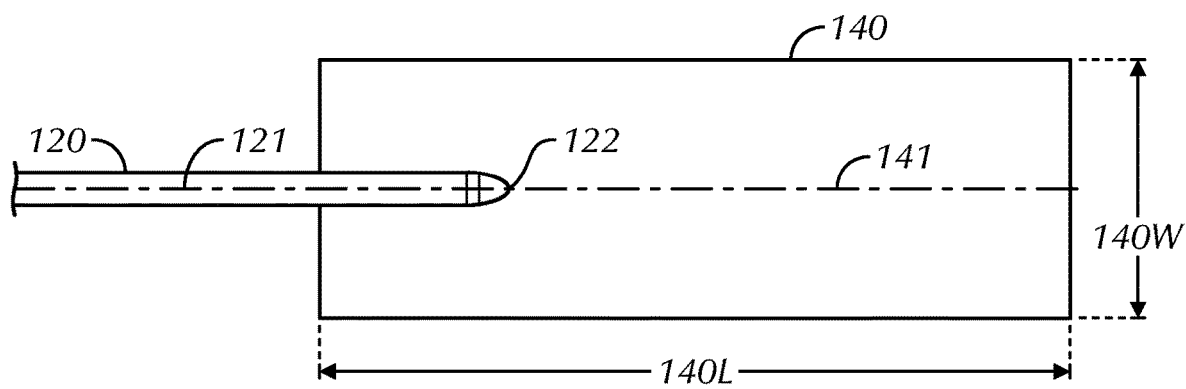
FIG. 8 is a top view of a pin and a lead prior to being pressed and joined together to form a component in accordance with at least one example of the invention.
Figure 12:
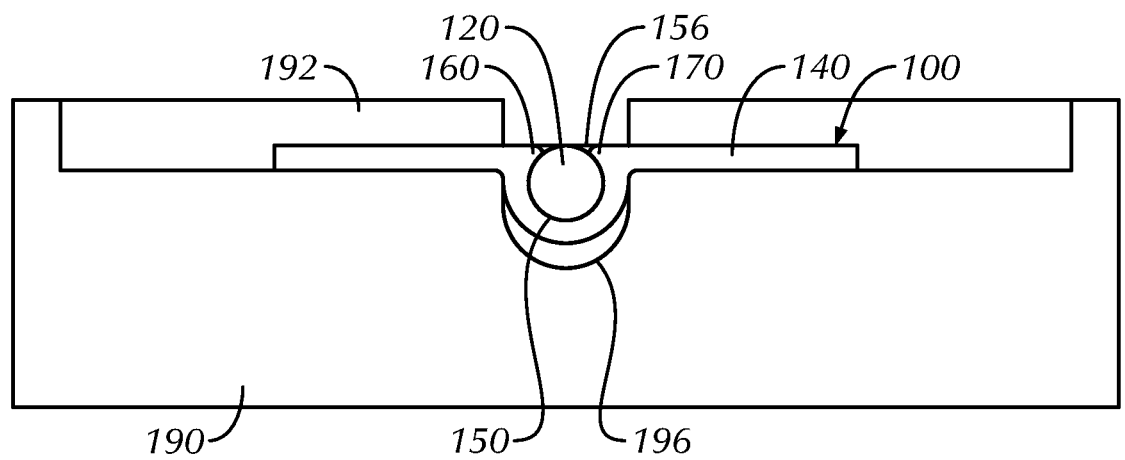
FIG. 12 is a side cross-sectional view of a pin and a lead joined together to form a component in accordance with at least one example of the invention.

With the portion of the pin 120 disposed in place within the channel 150 of the lead 140, in some examples, at least the first joint 160 is formed along at least a portion of the first channel side 152 (see FIGS. 5 and 12). In some examples, the first joint 160 includes the second material of the lead 140 deformed to at least partially close the channel opening 156 at the location of the first joint 160, thereby retaining the pin 120 within the channel 150 of the lead 140 to attach the lead 140 to the pin 120. In some examples, forming at least the first joint 160 includes melting the second material of the lead 140 at the first joint 160 to at least partially close the channel opening 156 at the location of the first joint 160.

In some examples, the second joint 170 is formed along at least a portion of the second channel side 154 (see FIG. 12). In some examples, the second joint 170 includes the second material of the lead 140 deformed to at least partially close the channel opening 156 at the location of the second joint 170, thereby retaining the pin 120 within the channel 150 of the lead 140 to attach the lead 140 to the pin 120. In some examples, forming the second joint includes melting the second material of the lead 140 at the second joint 170 to at least partially close the channel opening 156 at the location of the second joint 170.

In some examples, melting of the second material of the lead 140 includes brazing. In further examples, forming of the first joint 160 and/or forming the second joint 170 include laser brazing. In some examples, with the pin 120 and the lead 140 properly positioned within the laser brazing apparatus 180, the laser head 184 is aligned with respect to the pin 120 and the lead 140 and passed along the first channel side 152 and/or the second channel side 154 in order to form the first joint 160 and/or the second joint 170 at the desired locations. In some examples, the laser head 184 is moved and the base 182 of the laser brazing apparatus 180 is held stationary in order to pass the laser beam 184A along the first channel side 152 and/or the second channel side 154. In other examples, the base 182 of the laser brazing apparatus 180 is moved and the laser head 184 is held stationary in order to pass the laser beam 184A along the first channel side 152 and/or the second channel side 154.

Once the first joint 160 and/or the second joint 170 are formed, the completed component 100 can be removed from the laser brazing apparatus 180. In some examples, the component 100 can be used in an electrochemical cell, such as, for instance, a battery. In some examples, the pin 120 of the component forms the feedthrough pin and positive terminal of the battery. In some examples, the lead 140 connects to a cathode or a cathode stack of the battery.

The present inventors have recognized various advantages of the subject matter described herein. The present inventors have recognized, among other things, that the present subject matter can be used to join pieces together, for instance, to form a component for use in various applications, such as, but not limited to, electrochemical cell components. In various examples, the present subject matter is advantageous in that it provides a method of joining pieces formed from materials that are substantially incompatible with other methods of joining. For instance, the present subject matter is advantageous because it provides a method of joining an aluminum piece to a molybdenum piece to form a relatively strong joint between the pieces. Also, the present subject matter is advantageous in that it provides for a consistent and/or qualifiable method of joining two pieces together. The present subject matter can be used to join pieces together even in the event that the pieces are formed from materials that are difficult to attach to one another using one or more other methods of attachment. While various advantages of the example systems are listed herein, this list is not considered to be complete, as further advantages may become apparent from the description and figures presented herein.

Although the subject matter of the present patent application has been described with reference to various examples, workers skilled in the art will recognize that changes can be made in form and detail without departing from the scope of the subject matter recited in the below claims.

The above Detailed Description includes references to the accompanying drawings, which form a part of the Detailed Description. The drawings show, by way of illustration, specific examples in which the present apparatuses and methods can be practiced. These embodiments are also referred to herein as "examples."

The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In this document, the terms "a" or "an" are used to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "about" and "approximately" or similar are used to refer to an amount that is nearly, almost, or in the vicinity of being equal to a stated amount.

In the appended claims, the terms "including" and "in which" are used as the plain-English equivalents of the respective terms "comprising" and "wherein." Also, in the following claims, the terms "including" and "comprising" are open-ended, that is, an apparatus or method that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to allow the reader to quickly ascertain the nature of the technical disclosure. It is submitted with the understanding that it will not be used to interpret or limit the scope or meaning of the claims.

The invention claimed is:

1. A method of attaching a pin to a lead to form a component, the pin including a pin diameter and a pin length, the pin including a first material, the lead including a lead width, a lead thickness, and a lead length, the lead including a second material different from the first material of the pin, the method comprising:
   aligning the pin with the lead so that at least a portion of the pin overlaps at least a portion of the lead;
   pressing the portion of the pin overlapping the portion of the lead into the lead to form a channel within the lead, the channel including a channel depth, a channel length, and a channel opening defined at least partially by opposing first and second channel sides extending the channel length; and
   forming at least a first joint along at least a portion of the first channel side, wherein the first joint includes the second material of the lead deformed to at least partially close the channel opening at the location of the first joint, thereby retaining the pin within the channel of the lead to attach the lead to the pin.

2. The method of claim 1, wherein forming at least the first joint includes melting the second material of the lead at the first joint to at least partially close the channel opening at the location of the first joint.

3. The method of claim 2, wherein melting the second material of the lead includes brazing.

4. The method of claim 1, comprising forming a second joint along at least a portion of the second channel side, wherein the second joint includes the second material of the lead deformed to at least partially close the channel opening at the location of the second joint, thereby retaining the pin within the channel of the lead to attach the lead to the pin.

5. The method of claim 4, wherein forming the second joint includes melting the second material of the lead at the second joint to at least partially close the channel opening at the location of the second joint.

6. The method of claim 5, wherein melting the second material of the lead includes brazing.

7. The method of claim 4, wherein forming the first joint and forming the second joint each includes laser brazing.

8. The method of claim 4, wherein forming the first joint and the second joint includes forming the first joint and the second joint along the channel at similar locations with respect to the pin.

9. The method of claim 1, wherein pressing the portion of the pin overlapping the portion of the lead into the lead includes deforming the portion of the lead to form the channel within the lead.

10. The method of claim 1, wherein a melting point of the first material is higher than a melting point of the second material.

11. The method of claim 1, wherein the first material includes molybdenum and the second material includes aluminum.

12. The method of claim 1, wherein aligning the pin with the lead includes substantially aligning a longitudinal axis of the pin with a midline of the lead running the lead length.

13. The method of claim 1, wherein forming the channel within the lead includes forming the channel wherein the channel depth is substantially equal to the pin diameter of the pin.

14. A method of attaching a pin to a lead to form a component, the pin including a pin diameter and a pin length, the pin including a first material, the lead including a lead width, a lead thickness, and a lead length, the lead including a second material different from the first material of the pin, the method comprising:
   aligning the pin with the lead so that at least a portion of the pin overlaps at least a portion of the lead;
   pressing the portion of the pin overlapping the portion of the lead into the lead to form a channel within the lead, the channel including a channel depth, a channel length, and a channel opening defined at least partially by opposing first and second channel sides extending the channel length;
   forming a first joint along at least a portion of the first channel side by melting the second material of the lead at the first joint to at least partially close the channel opening at the location of the first joint; and
   forming a second joint along at least a portion of the second channel side by melting the second material of the lead at the second joint to at least partially close the channel opening at the location of the second joint, wherein the first joint and the second joint retain the pin within the channel of the lead to attach the lead to the pin.

15. The method of claim 14, wherein melting the second material of the lead includes brazing.

16. The method of claim 14, wherein forming the first joint and forming the second joint each includes laser brazing.

17. The method of claim 14, wherein forming the first joint and the second joint includes forming the first joint and the second joint along the channel at similar locations with respect to the pin.

18. The method of claim 14, wherein pressing the portion of the pin overlapping the portion of the lead into the lead includes deforming the portion of the lead to form the channel within the lead.

19. The method of claim 14, wherein aligning the pin with the lead includes substantially aligning a longitudinal axis of the pin with a midline of the lead running the lead length.

20. A method of attaching a pin to a lead to form a component, the pin including a pin diameter and a pin length, the pin including a first material, the lead including a lead width, a lead thickness, and a lead length, the lead including a second material different from the first material of the pin, the method comprising:
   aligning the pin with the lead so that at least a portion of the pin overlaps at least a portion of the lead, wherein a longitudinal axis of the pin is substantially aligned with a midline of the lead running the lead length;

pressing the portion of the pin overlapping the portion of the lead into the lead to deform the portion of the lead to form a channel within the lead, the channel including a channel depth, a channel length, and a channel opening defined at least partially by opposing first and second channel sides extending the channel length, wherein the channel depth is at least substantially equal to the pin diameter of the pin;

forming a first joint along at least a portion of the first channel side using laser brazing to melt the second material of the lead at the first joint to at least partially close the channel opening at the location of the first joint; and forming a second joint along at least a portion of the second channel side using laser brazing to melt the second material of the lead at the second joint to at least partially close the channel opening at the location of the second joint, wherein the first joint and the second joint retain the pin within the channel of the lead to attach the lead to the pin.

\* \* \* \* \*